(12) United States Patent
Engels et al.

(10) Patent No.: US 12,337,694 B2
(45) Date of Patent: Jun. 24, 2025

(54) WHEEL MOTOR COMPENSATION SYSTEMS AND METHODS USING WHEEL SENSOR DATA

(71) Applicant: Ford Global Technologies, LLC, Dearborn, MI (US)

(72) Inventors: Jonathan Engels, Tecumseh, MI (US); Mahmoud Ghannam, Canton, MI (US); Sai Prasanth Velusamy, Canton, MI (US); Dilip Patel, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 468 days.

(21) Appl. No.: 17/938,480

(22) Filed: Oct. 6, 2022

(65) Prior Publication Data
US 2024/0116368 A1   Apr. 11, 2024

(51) Int. Cl.
| | |
|---|---|
| *B60L 15/20* | (2006.01) |
| *B60C 11/24* | (2006.01) |
| *B60C 23/06* | (2006.01) |
| *B60K 7/00* | (2006.01) |

(52) U.S. Cl.
CPC .............. *B60L 15/20* (2013.01); *B60C 11/24* (2013.01); *B60C 11/243* (2013.01); *B60C 23/064* (2013.01); *B60K 7/0007* (2013.01); *B60L 2240/423* (2013.01); *B60L 2240/463* (2013.01); *B60L 2240/465* (2013.01)

(58) Field of Classification Search
None
See application file for complete search history.

(56) References Cited

U.S. PATENT DOCUMENTS

| | | | |
|---|---|---|---|
| 6,339,956 B1 | 1/2002 | Huinink et al. | |
| 7,778,741 B2 | 8/2010 | Rao et al. | |
| 2007/0251621 A1 | 11/2007 | Prost | |
| 2020/0079157 A1* | 3/2020 | Baumgaertel | ....... G01M 17/025 |
| 2024/0410791 A1* | 12/2024 | Fujiwara | ............... B60C 23/064 |

FOREIGN PATENT DOCUMENTS

| | | |
|---|---|---|
| CN | 102390227 A | 3/2012 |
| CN | 107696998 A | 2/2018 |

OTHER PUBLICATIONS

Mikel Choperena, Watch a Video of a Wireless and Battery-Free TPMS (Tire Pressure Monitoring System) With Pressure and Temperature Sensors Inside a Tire, The FARSENS Blog, Oct. 31, 2014, 1-5.

* cited by examiner

*Primary Examiner* — Todd Melton
(74) *Attorney, Agent, or Firm* — Frank Lollo; Eversheds Sutherland (US) LLP

(57) ABSTRACT

A wheel motor compensation system is for a vehicle. The vehicle has a wheel motor and a tire coupled to the wheel motor. The system includes a hybrid wireless tire sensor (HWTS) coupled to an interior of the tire, a processor electrically connected to the wheel motor, and a memory. The memory has instructions that, when executed by the processor, cause the processor to perform operations including gathering real time data with the HWTS, and utilizing the real time data to compensate the wheel motor so that preferred torque is applied to the tire.

20 Claims, 10 Drawing Sheets

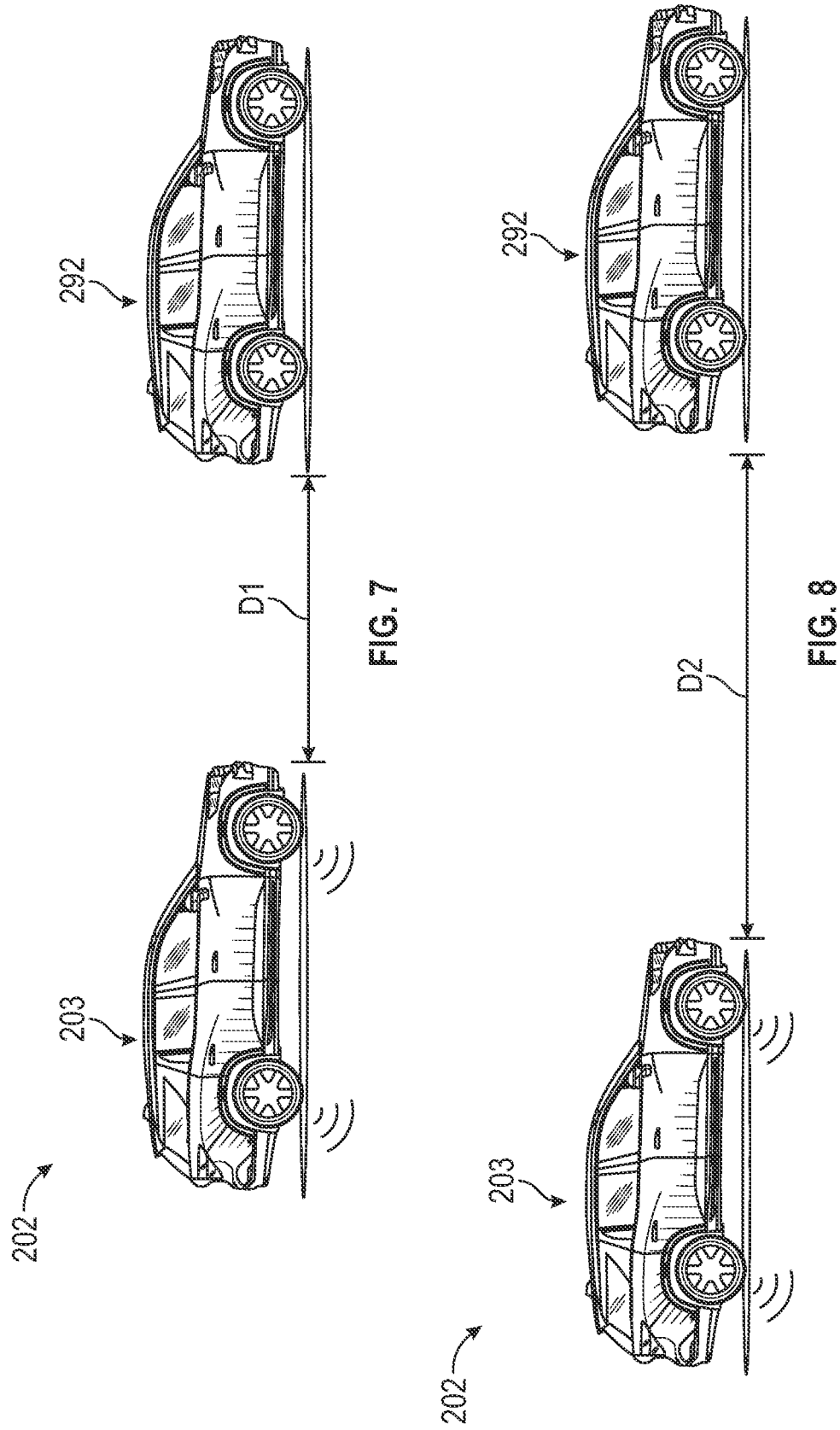

WHEEL MOTOR COMPENSATION SYSTEMS AND METHODS USING WHEEL SENSOR DATA

BACKGROUND

Current individual wheel torque compensation systems use wheel speed, torque, and slip data to compensate the wheel motor. Additionally, electric vehicle systems, for example, use a motor per wheel (e.g., four total wheel motors) that can each change the torque applied to an individual tire if the wheel motor notices that the tire is rotating faster than the other tires.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 7 and 8 show the vehicle of FIG. 6 and another vehicle, and shown with the vehicle of FIG. 6 in a first position and a second position, respectively.

DETAILED DESCRIPTION

Overview

Figure 1:
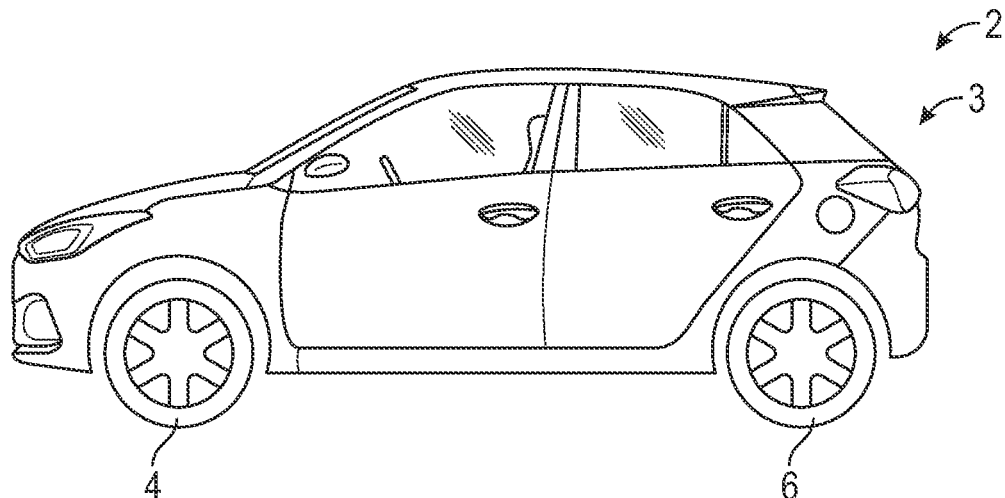
FIG. 1 depicts an example vehicle, in accordance with one non-limiting embodiment of the disclosed concept.

The systems, apparatuses, and methods disclosed herein assist at least in part with theft detection, adaptive control, drive mode adaptation, and wheel motor compensation of vehicles. Instead of utilizing tire pressure monitoring sensors, which are used in many of today's vehicles, the disclosed systems may rely on hybrid wireless tire sensors (HWTSs) coupled to a tire. These sensors may include capabilities that allow them to be powered in non-traditional manners, such as without traditional batteries. For example, the HWTSs may include energy harvesting capabilities that allow them to generate a voltage in response to a deformation of the tire. In other instances, HWTSs may include the ability to use rechargeable batteries (i.e., not single use batteries) or even be battery-less (in essence a hybrid powered solution). It is also contemplated that the HWTSs disclosed herein are configured to transmit real time data corresponding to any one or all of tire temperature, pressure, deformation, wear, rotational speed, wheel slip, and vibration-sound, to a processor of the vehicle.

In order to detect and guard against theft, the theft detection system relies on a voltage generated by the energy harvesting capabilities, which in one or more embodiments includes a piezoelectric material. The piezoelectric material may allow the HWTSs to remain in an ACTIVE state even when the vehicle is in an OFF state. When the voltage is generated, such as by tire deformation from a thief attempting to steal one of the tires, a signal is sent from the HWTS to the processor of the vehicle. The processor may read the signal and compare the change in voltage to a predetermined voltage pattern, which may include a non-theft signature. If the processor determines that the change in voltage does not correspond to the non-theft signature, the processor is configured to cause the vehicle to initiate any number of responses. These responses may include playing an alert message with an audio system, sounding a horn, flashing lights, recording data with a camera, and/or wirelessly sending a theft alert signal to an external device. Any of these responses are configured to deter a thief and/or assist in apprehension of the thief. The responses also may cease if the change in voltage begins to correspond to the non-theft signature, or if a user sends a signal to the processor from an external device.

In order to assist with controlling a vehicle, the adaptive control system relies on the real time data sent to the vehicle's processor by the HWTSs. Today's vehicles are not controlled by real time information corresponding to tire and environmental conditions. With the HWTSs, the real time data, which may be gathered continuously while the vehicle is being operated, is configured to be utilized with an advanced driver assistance system (ADAS) of the vehicle. In one example embodiment, the adaptive control system adjusts any one of a following distance, cruise control speed, and/or actuation distance for braking that is set by the ADAS. That is, these parameters may be changed from a first value to a second value by the system, based on the real time data from the HWTSs. Having the vehicle controlled by data of real time tire and environmental conditions is ideal.

In order to assist with operating a vehicle efficiently, the drive mode adaptation system utilizes the real time data sent by the HWTSs with a drive mode selector in order to determine a preferred drive mode. Once the preferred drive mode is determined, an alert may be sent to a driver of the vehicle, so that the driver can easily select the preferred drive mode. In another example, the vehicle may automatically select the preferred drive mode. The vehicle may also include a camera that gathers terrain data, and the terrain data may be used with the real time data in order to boost a confidence score of terrain conditions determined by the processor. Accounting for real time data of tire and environmental conditions increases the likelihood of a preferred drive mode being selected. Further yet, having the vehicle operated in a preferred drive mode is ideal for both the vehicle and the driver.

In one or more embodiments, the wheel motor compensation system utilizes the real time data from the HWTSs to compensate a wheel motor so that preferred torque is applied to a tire. The system may compare the data from the HWTS of one tire to the data of the HWTS of another tire in order to compensate at least one of the wheel motors. That is, if the system determines that one tire would benefit from, for example, increased torque, based on data from any number of the tires, the system is configured to compensate the corresponding wheel motor. In this manner, the wheel motors are positioned to more efficiently compensate their corresponding tires. Today's systems do not account for real time data corresponding to tire and environmental conditions in this manner when determining how to compensate wheel motors. Accounting for data corresponding to real time tire and environmental conditions allows the vehicle to be more efficiently operated.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

As used herein, the term "number" shall mean one or an integer greater than one (i.e., a plurality).

As used herein, the term "tire" shall mean a wheel and rubber cushion that fits around a wheel, usually via compressed air.

Figure 2:
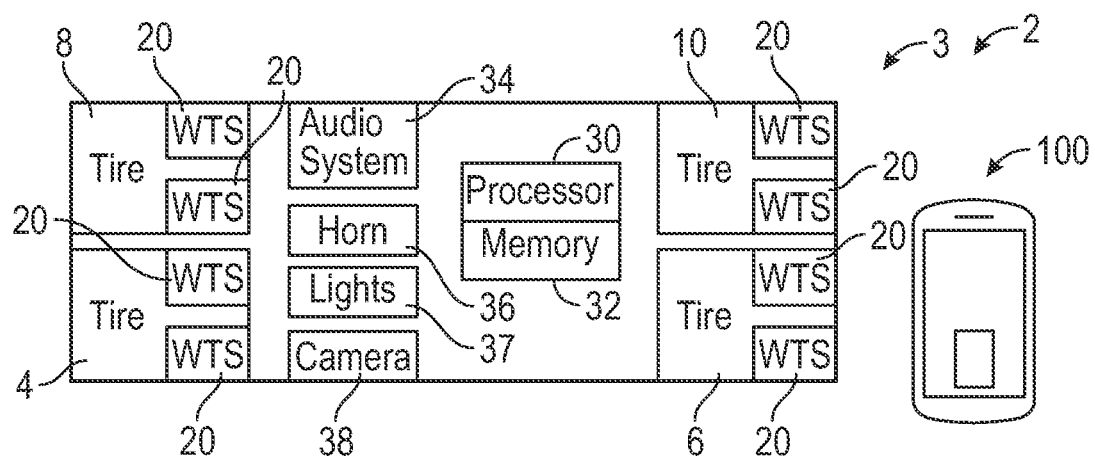
FIG. 2 is a simplified view of the vehicle of FIG. 1.

FIG. 1 shows a vehicle 2 and theft detection system 3 therefor, in accordance with one non-limiting embodiment of the disclosed concept. FIG. 2 shows a simplified view of the vehicle 2 of FIG. 1, and also shows an external device (e.g., without limitation, mobile device 100). The vehicle 2 includes a number of tires 4,6,8,10, a number of hybrid wireless tire sensors (HWTSs) 20 each coupled to an interior of one of the tires 4,6,8,10, a processor 30, and a memory 32. The theft detection system 3 includes the HWTS 20, the processor 30, and the memory 32. In accordance with the disclosed concept, the HWTSs 20 are different than tire pressure monitoring sensors (TPMSs) of known vehicles, at least in that they are configured to be in an ACTIVE state when the vehicle 2 is in an OFF state. Furthermore, by being coupled to the interior (e.g., on surfaces facing away from an exterior of the vehicle 2) of the tires 4,6,8,10, the HWTSs 20 are more difficult for attackers to reach inside and disable.

Figure 3:
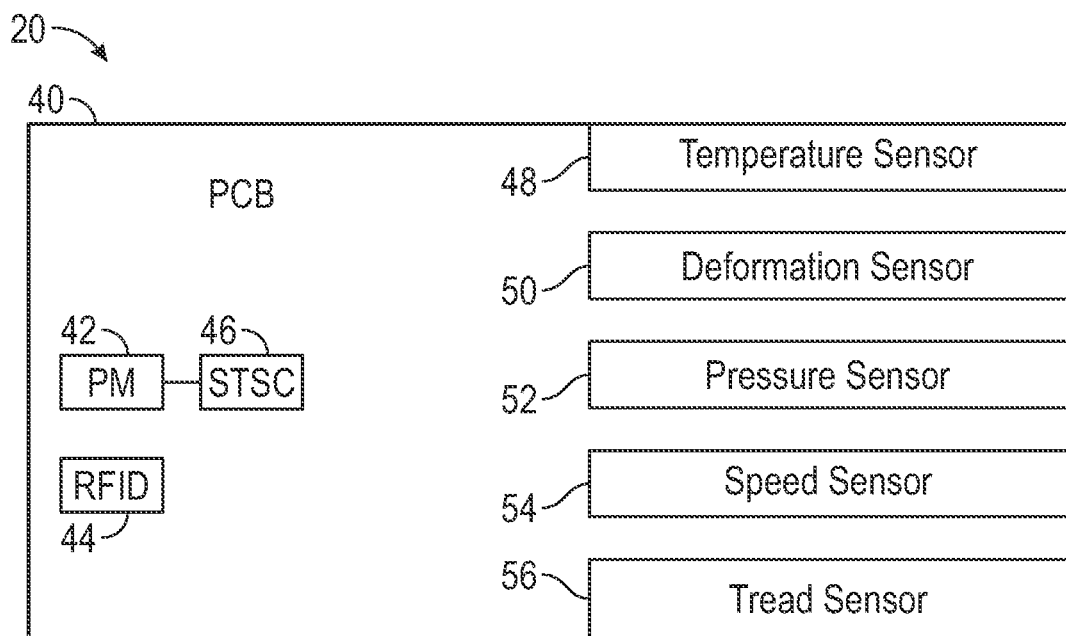
FIG. 3 is a simplified view of a hybrid wireless tire sensor for the vehicle of FIGS. 1 and 2.

As will be described below, the HWTSs 20 provide the vehicle 2 with a number of additional capabilities not present in today's vehicles. For example, the HWTSs 20 are configured to detect theft of any one of the tires 4,6,8,10 by notifying the vehicle 2 of changes in status of the tires 4,6,8,10. In order to perform this function, the HWTSs 20, as shown in FIG. 3, are provided with a flexible printed circuit board 40, a piezoelectric material 42 integrated into the printed circuit board 40 and configured to generate a voltage responsive to a change in deformation of the tires 4,6,8,10, and an RFID antenna 44. Moreover, the RFID antenna 44 is electrically connected to the printed circuit board 40 and is configured to wirelessly transmit signals to and from the HWTS 20 (e.g., be interrogated by the processor 30 (FIG. 2) of the electronic control unit of the vehicle 2). The wireless connection(s) between the HWTS 20 and the processor 30 may include various low-energy protocols including, for example, Bluetooth®, Bluetooth® Low-Energy (BLE®), UWB, Near Field Communication (NFC), or other protocols. Also shown as part of the HWTS 20, and as will be discussed in greater detail below, are a temperature sensor 48, a deformation sensor 50, a pressure sensor 52, a speed sensor 54, and a tread sensor 56.

In one example embodiment, the HWTS 20 may be devoid of a battery. As such, with the HWTS 20 being devoid of a battery, any number (e.g., 1, 2, 3, 4, etc.) of the HWTSs 20 may be coupled to an interior of one of the tires 4,6,8,10, thereby providing a distributed and finer collection of data. It will also be appreciated that any of the vehicles contemplated herein (e.g., vehicles 202,302,402, discussed below) are similarly configured to have any number of HWTSs coupled to the interior of their tires.

The piezoelectric material 42 advantageously provides the HWTS 20 with energy harvesting capabilities, such that changes in deformation of a corresponding tire 4,6,8,10 cause the piezoelectric material 42 to generate a voltage and power the HWTS 20. This helps to minimize draining the main battery (not shown) of the vehicle 2. In accordance with one embodiment of the disclosed concept, the HWTS 20 further has a short term storage capacitor 46 electrically connected to the printed circuit board 40 and configured to be charged by the piezoelectric material 42. It will, however, be appreciated that other suitable methods of storing energy are contemplated by the disclosed concept.

Accordingly, the HWTSs 20 are configured to sense changes in deformation of the tires 4,6,8,10. This is useful for theft detection. Specifically, when the vehicle 2 is in an OFF state, e.g., FIG. 1, the HWTSs 20 are in an ACTIVE state (the HWTSs 20 are also in an ACTIVE state when the vehicle 2 is in an ON state). What this means is that even when the main electronics of the vehicle 2 are powered down, such as when the vehicle 2 is parked and turned off, the HWTS 20 is still in an ACTIVE state and configured to transmit data. That is, the HWTS 20 has the capability to transmit signals to the processor 30 once the tire status changes. Stated differently, the HWTS 20 does not wait for the processor 30 of the electronic control unit to energize it or wake it up. In other words, the HWTS 20 is energized independent of the main electronics of the vehicle 2, such as the vehicle's battery. Today's TPMSs, by way of contrast, typically rely on external power sources.

Figure 4:
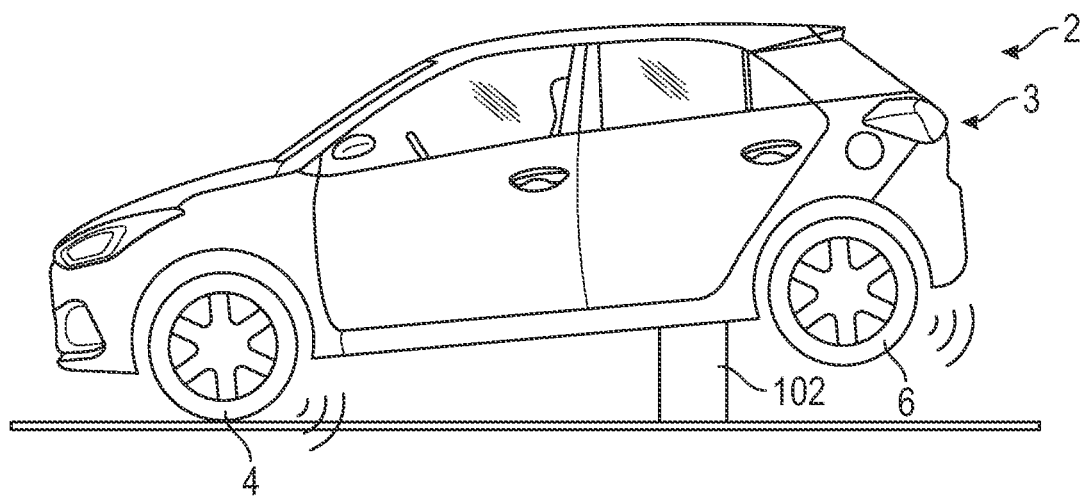
FIG. 4 is another view of the vehicle of FIG. 1, shown with a car jack, and with the vehicle in an elevated state.

FIG. 4 shows the vehicle 2 in an elevated state, and supported by a car jack 102 (shown in simplified form). This may have occurred, for instance, via a car thief employing the car jack 102 in an attempt to steal the tire 6. It will be appreciated that if the vehicle 2 is rocked or lifted, such as via the car jack 102, the deformation of each of the tires 4,6,8,10 will change, and the piezoelectric material 42 will detect multi-axis change in the status of the tires 4,6,8,10.

In one example embodiment, when the vehicle 2 moves from the first position (FIG. 1) to the second position (FIG. 4), it is understood that a tire pressure of the tire 6 is decreasing while a tire pressure of the tire 4 is increasing. When this pressure change occurs in each of the tires 4,6, and the tires 4,6 deform, a voltage is generated in the piezoelectric material 42 of the HWTSs 20. It is understood that the voltage that is generated in the piezoelectric material 42 will have a predetermined voltage pattern if no theft is occurring. That is, the change in voltage will have a non-theft signature if no theft is occurring. It is in this manner that the processor 30 is able to distinguish between different tire events (e.g., a full rotation, kick, noise of a passing vehicle, etc. versus a theft event).

It will also be appreciated that the dynamic equation for angular motion of a wheel is:

$$\dot{w}_w = [T_e - T_b - R_w F_t - R_w F_w]/J_w$$

where $R_w$=radius of the wheel; $N_y$=normal reaction force from the ground; $T_e$=shaft torque from the engine; $T_b$=brake torque; $F_t$=tractive force; $F_w$=wheel viscous friction; and $J_w$=moment of inertia of the wheel. When the vehicle 2 is in an OFF state (e.g., is parked and turned off), all wheels are stationary. In this state, each of the HWTSs 20 should have no motion, or in other words, $\dot{w}_w$ should equal zero. However, if the vehicle 2 is in an OFF state, and $\dot{w}_w > 0$ for the wheels of one or two of the tires 4,6,8,10, the theft detection system 3 will flag this as a potential theft.

When the piezoelectric material 42 has generated a voltage with the vehicle 2 in an OFF state, vehicle electronics may be employed to compare the detected voltage to the non-theft signature. More specifically, referring again to FIG. 2, the memory 32 has instructions that, when executed by the processor 30, cause the processor 30 to perform a number of operations. These operations include detecting a change in voltage across the HWTS 20 responsive to a change in deformation of the tire 4,6,8,10, and determining, based on the change in deformation of the tire 4,6,8,10, if a theft is occurring.

One example advantage of the theft detection system 3 is that the processor 30 is able to detect the voltage across the HWTS 20 from the piezoelectric material 20. This is achievable via a signal that is sent from the RFID antenna 44 to the processor 30. In order to determine if a theft is occurring, the voltage across the HWTS 20 must be compared to the predetermined voltage pattern.

Continuing to refer to FIG. 2, the theft detection system 3 of the disclosed concept is provided with mechanisms to guard against theft and also to alert a vehicle owner of a theft. More specifically, the vehicle 2 further has an audio system 34, a horn 36, a number of lights 37, and a camera 38. If the processor 30 determines that the change in voltage across the HWTS 20 (e.g., responsive to the vehicle 2 moving from the position shown in FIG. 1 to the position shown in FIG. 4) does not match the predetermined voltage pattern (e.g., does not match a non-theft signature), in one example embodiment the processor 30 may further cause the vehicle 2 to play an alert with the audio system 34. The alert may be in the form of a message (e.g., "STEP AWAY FROM THE VEHICLE").

After the alert has been played for a predetermined amount of time, the processor 30 may again compare the change in voltage across the HWTS 20 to the predetermined voltage pattern (e.g., non-theft signature). This may be done to determine if a thief has ceased attempting to steal one of the tires 4,6,8,10. If the voltage begins to match the predetermined voltage pattern, such as when the thief ceases attempting to steal one of the tires 4,6,8,10, the processor 30 may cause the audio system 34 to cease playing the alert. However, if the change in voltage across the HWTS 20 continues to not match the predetermined voltage pattern, that is, if a thief continues in an attempt to steal one of the tires 4,6,8,10, the processor 30 may activate a vehicle alert response. The vehicle alert response may include any one of sounding the horn 36, flashing the lights 37, recording data with the camera 38, and/or wirelessly sending a theft alert signal to the mobile device 100.

The mobile device 100 may be communicatively coupled with the vehicle 2 via one or more network(s), which may communicate via one or more wireless connection(s), and/or may connect with the vehicle 2 directly using near field communication (NFC) protocols, Bluetooth® protocols, Wi-Fi, Ultra-Wide Band (UWB), and other possible data connection and sharing techniques. Moreover, after the vehicle alert response has been activated, a user, such as the owner of the vehicle, may deactivate the vehicle alert response via a signal sent from the mobile device 100 to the processor 30.

It will be appreciated that the aforementioned operations of the processor 30 are configured to deter theft. If a thief is attempting to steal the tire 6, and an alert is played with the audio system 34, or the horn 36 sounds, or the lights 37 flash, the thief may worry that he or she will be noticed, and thus cease stealing the tire 6. This is highly desirable because, as stated above, the price of some wheels is rather high, making them burdensome to replace. Similarly, if the thief is successful in taking the tire, the camera 38 may get footage of who the thief is, thus increasing the likelihood that the thief will be apprehended. Furthermore, as stated above, the HWTS 20 is configured to be ACTIVE while the vehicle 2 is in an OFF state (and also when the vehicle 2 is in an ON state). As such, large power consumption devices of the vehicle 2 (e.g., camera sensors, Radio Detection and Ranging (RADAR or "radar") sensor configured for detection and localization of objects using radio waves, a Light Detecting and Ranging (LiDAR or "lidar") sensor, not shown) need only be energized in the event of a theft, thus saving battery power.

Additionally, the HWTS 20 is different than the TPMSs used in today's vehicles. TPMSs use battery and are rather limited in their ability to sample data frequently on battery power (e.g., only provide a single-axis evaluation). Because the HWTS 20 of the disclosed concept is powered by the piezoelectric material 42, more frequent information is able to be provided to the processor 30.

Figure 5:
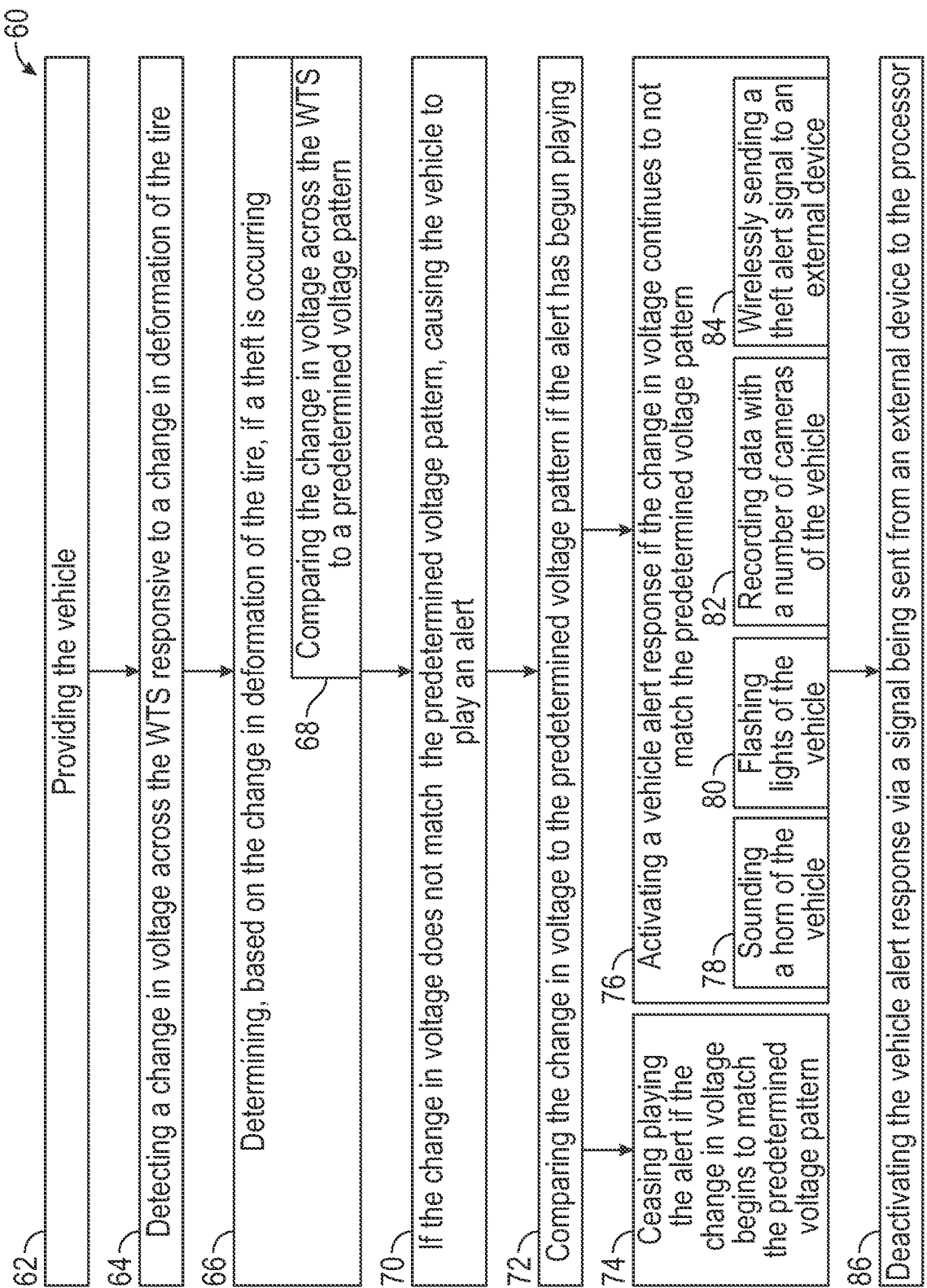
FIG. 5 is a flow chart corresponding to a method of detecting theft of a tire of the vehicle of FIG. 1.

FIG. 5 shows an example method 60 of detecting theft of a tire 4,6,8,10 of the vehicle 2. The method 60 includes a first step 62 of providing the vehicle 2, a second step 64 of detecting a change in voltage across the HWTS 20 responsive to a change in deformation of the tire 4,6,8,10, and a third step 66 of determining, based on the change in deformation of the tire 4,6,8,10, if a theft is occurring. The third step 66 may include a step 68 of comparing the change in voltage across the HWTS 20 to a predetermined voltage pattern. The method 60 further includes a step 70 of causing the vehicle 2 to play an alert if the change in voltage does not match the predetermined voltage pattern, and a step 72 of comparing the change in voltage to the predetermined voltage pattern if the alert has begun playing. Depending on whether the change in voltage matches the predetermined voltage pattern, the method 60 includes two steps. A first step 74 includes ceasing playing the alert if the change in voltage begins to match the predetermined voltage pattern. A second step 76 includes activating a vehicle alert response if the change in voltage continues to not match the predetermined voltage pattern. Activating a vehicle alert response may include energizing at least one of camera, radar, and lidar sensors (not shown) of the vehicle 2. The step 76 may include a step 78 of sounding the horn 36 of the vehicle 2, a step 80 of flashing the lights 37 of the vehicle 2, a step 82 of recording data with the camera 38 of the vehicle 2, and a step 84 of wirelessly sending a theft alert signal to an external device (e.g., mobile device 100). Finally, the method 60 includes a step 86 of deactivating the vehicle alert response via a signal being sent from the mobile device 100 to the processor 30.

Accordingly, it will be appreciated that the disclosed concept provides for a new theft detection system 3, vehicle 2 including the same, and associated method 60, in which a number of HWTSs 20 are able to communicate with the processor 30 of the vehicle when the vehicle is in an OFF state, and allow the processor 30 to determine if a theft is occurring. In response, the processor 30 is configured to cause an alert message to be played, sound the horn 36 of the vehicle 2, flash the lights 37 of the vehicle 2, record data with the camera 38 of the vehicle 2, and/or wirelessly communicate with a mobile device 100 to alert an owner of a theft. The aforementioned vehicle responses may be performed in isolation and in any order.

Figure 6:
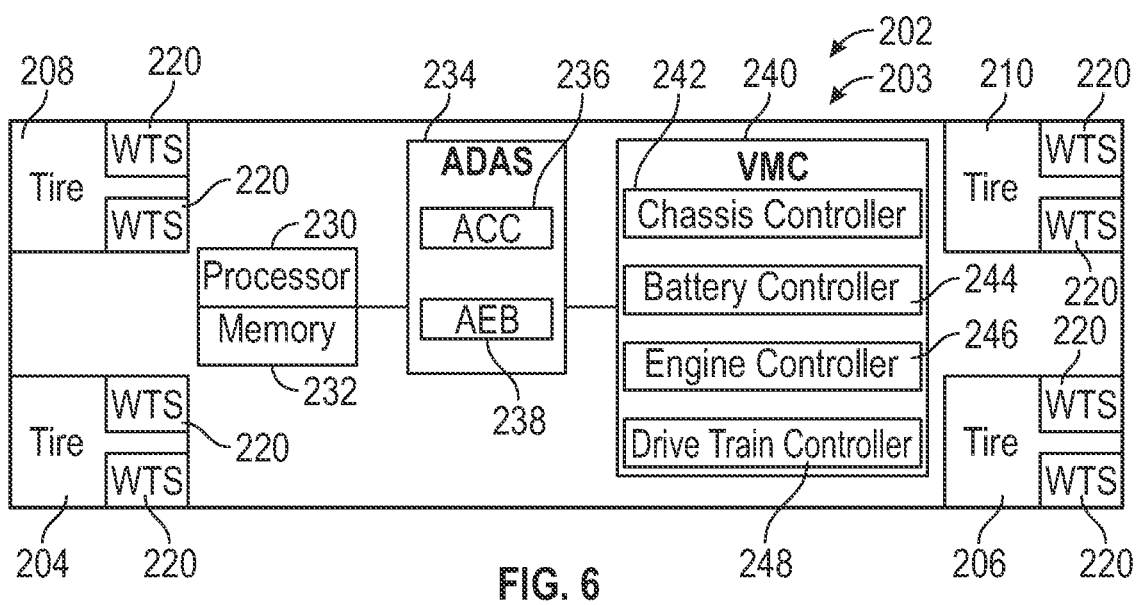
FIG. 6 is a simplified view of another vehicle, in accordance with another non-limiting embodiment of the disclosed concept.

FIG. 6 is a simplified view of a vehicle 202 and an adaptive control system 203 therefor, in accordance with another non-limiting embodiment of the disclosed concept. The vehicle 202 is structured similar to the vehicle 2, discussed above, and includes a number of tires 204,206, 208,210, a number of HWTSs 220 coupled to an interior of each of the tires 204,206,208,210, a processor 230 and a memory 232. The adaptive control system 203 includes the HWTS 220, the processor 230, and the memory 232.

It will be appreciated that each of the HWTSs 220 is configured exactly the same as the HWTSs 20, discussed above and shown in FIG. 3. However, while the HWTSs 20 were described in association with the vehicle 2 being in an OFF state in order to guard against theft, the HWTSs 220 will be described herein in association with the vehicle 202 being in an ON state and driving. As such, because each of the HWTSs 220 is powered by a corresponding piezoelectric material (e.g., see piezoelectric material 42 in FIG. 3), it will be appreciated that the HWTSs 220 are configured to transmit real time data to the processor 230. Stated differently, the data is configured to be constantly and/or instantaneously transmitted to the processor 230 as it is generated and while the vehicle 202 is being operated. Moreover, because the HWTSs 220 include temperature, deformation, speed, pressure, and tread sensors 48,50,52,54,56 (see FIG. 3), it will be appreciated that data from each of these sensors is configured to be transmitted in real time to the processor 230 while the vehicle 202 is driving. Wheel slip data can also be determined by the processor 230 based on the real time data from each of the sensors 48,50,52,54,56.

By transmitting this real time data to the processor 230, the HWTS 220 is advantageously able to provide the vehicle 202 with capabilities not possible with today's TPMSs. More specifically, and continuing to refer to FIG. 6, the vehicle 202 further includes an advanced driver assistance system (ADAS) 234. The ADAS 234 is configured to incorporate interface standards and run multiple vision-based algorithms to support real-time multimedia, vision coprocessing, and sensor fusion subsystems. The ADAS 234 has an adaptive cruise control system 236 and an automated braking system 238. The adaptive cruise control system 236 is particularly helpful when the vehicle 202 is on a highway, where a driver may find it difficult to monitor speed and other vehicles over a long period of time. Additionally, the adaptive cruise control system 236 can automatically cause the vehicle 202 to speed up, slow down, and at times stop the vehicle 202, depending on the actions of other objects in the immediate area. The automated braking system 238 uses sensors (not shown) to detect whether the vehicle 202 is near another vehicle or is near certain objects on the road. The automated braking system 238 can measure the distance to nearby traffic and alert the driver of obstructions. As such, the ADAS 234 is configured to set a following distance between the vehicle 202 and another vehicle (e.g., see other vehicle 292 in FIGS. 7 and 8), a cruise control speed, and an actuation distance for braking.

In accordance with the disclosed concept, the instructions of the memory 232 cause the processor 230 to gather the real time data with the HWTSs 220, and utilize the real time data with the ADAS 234 to adaptively control the vehicle 202. More specifically, the real time data is utilized by adjusting at least one of the following distance, the cruise control speed, and the actuation distance set by the ADAS 234 when the vehicle 202 is driving. In one example embodiment, the real time data is utilized by adjusting each of the following distance, the cruise control speed, and the actuation distance set by the ADAS 234 when the vehicle 202 is driving.

For example, as shown in FIG. 7, when the vehicle 202 is driving behind the other vehicle 292, the ADAS 234 (see FIG. 6) of the vehicle 202 is configured to set a following distance D1 responsive to an input by a driver. Additionally, responsive to the real time data of the HWTSs 220 being gathered by the processor 230, the processor 230 is configured to cause the ADAS 234 to adjust the following distance D1. That is, the following distance D1 is adjusted, or reset, to a new following distance (e.g., without limitation, following distance D2 depicted in FIG. 8, which is greater than D1). It will be appreciated that the processor 230 is similarly caused to adjust a cruise control speed and an actuation distance for braking (e.g., change or reset the cruise control speed and the actuation distance from a first value to a second, different value).

The reason for the adjustment is that in today's art, when a vehicle sets a following distance to follow a car in front of it, that distance is set independent of real time environmental and tire conditions. However, real time environmental and tire conditions are directly related to the ability of a vehicle to be operated and to be stopped. As such, factoring these parameters into the determination of the following distance, the cruise control speed, and the actuation distance for braking, makes the vehicle 202 more efficient to operate when the ADAS 234 is being employed.

In one non-limiting example of the disclosed concept, the HWTSs 220 send real time data corresponding to the pressure of the tires 204,206,208,210 to the processor 230. If one of the tires 204,206,208,210 is underinflated, or becomes suddenly underinflated, the HWTS 220 coupled to that tire will wirelessly communicate that information to the processor 230 in real time. That is, if one of the tires 204,206,208,210 becomes suddenly underinflated, at the moment that it becomes underinflated, the changes in pressure (e.g., the first pressure and the subsequent second pressure) will instantly be communicated from the corresponding HWTS 220 to the processor 230. This is done with data from the pressure sensor (see pressure sensor 52 in FIG. 3) being transmitted through the RFID antenna (see RFID antenna 44 in FIG. 3) to the processor 230.

In the absence of this information, an ADAS would set following distances, cruise control speeds, and actuation distances for braking based on parameters of an ideal tire (e.g., a tire having an ideal pressure, temperature, and deformation, etc.). However, as an underinflated tire (e.g., one less inflated than the ideal tire used as a model in today's ADAS systems) performs differently in terms of operating capability, driving efficiency can be affected by factoring in the real time pressure of the tires 204,206,208,210 into the following distance, cruise control speed, and actuation distance calculus.

In other words, the adaptive control system 203 of the disclosed concept advantageously accommodates the real time state of the tires 204,206,208,210. As the tires 204, 206,208,210 are the primary point of contact for the vehicle 202 with the ground, it is the primary source of data for the dynamic behavior of the vehicle 202. It will thus be appreciated that vehicle dynamic behaviors are made more efficient by the disclosed concept in order to provide appropriate contact with the road, and to maintain effective traction.

Moreover, other factors are advantageously factored into this calculus via the HWTSs 220 besides tire pressure. For example, and referring again to FIG. 3, the HWTS 20, which is configured the same as the HWTSs 220, further has the temperature sensor 48, the deformation sensor 50, the speed sensor 54, and the tread sensor 56, in addition to the aforementioned pressure sensor 52. The HWTS 20 is also configured to generate wheel slip data from these sensors 48,50,52,54,56. Because tire temperature, deformation, speed, tread, and wheel slip also affect the performance of the tires 204,206,208,210, factoring in real time data (e.g., at any instant while the car is being operated) of these parameters to the processor 230 allows the vehicle 202 to be more efficiently controlled.

For example, the tire data can be used by the processor 230 to perform surface analysis of the terrain in order to identify the nature of a surface as, for example, icy, snowy, slippery, and/or muddy. Accordingly, it will be appreciated that utilizing the real time data with the processor 230 includes determining road conditions, tire conditions, and weather conditions. In one example embodiment, weather conditions may be determined via a rain sensor (not shown) provided in the HWTS 220.

When this data from all the sensors 48,50,52,54,56 is analyzed by the processor 230, the corresponding following distance, cruise control speed, and actuation distance for braking of the ADAS 234 can all be adjusted, either together or independently, via predetermined algorithms programmed into the processor 230. TPMSs used in today's vehicles do not provide for this capability. Specifically, because the HWTSs 220 are powered by the piezoelectric material (e.g., piezoelectric material 42 in FIG. 3), they are able to provide more data, and provide that data more frequently than today's TPMSs. Additionally, as at least one of the HWTSs 220 is coupled to each of the tires 204,206, 208,210, real time data is advantageously sent to the processor 230 corresponding to a state of each of the tires 204,206,208,210.

Referring again to FIG. 6, the vehicle 202 further has a vehicle motion controller 240. The vehicle motion controller 240 has a chassis controller 242, a battery controller 244, an engine controller 246, and a drive train controller 248. When the processor 230 gathers the real time data from HWTSs 220, the processor 230 is configured to update the vehicle motion controller 240 in real time. Accordingly, the ADAS 234 and the vehicle motion controller 240, which are constantly being updated by the HWTSs 220, work together to allow a user to operate the vehicle 202.

Figure 9:
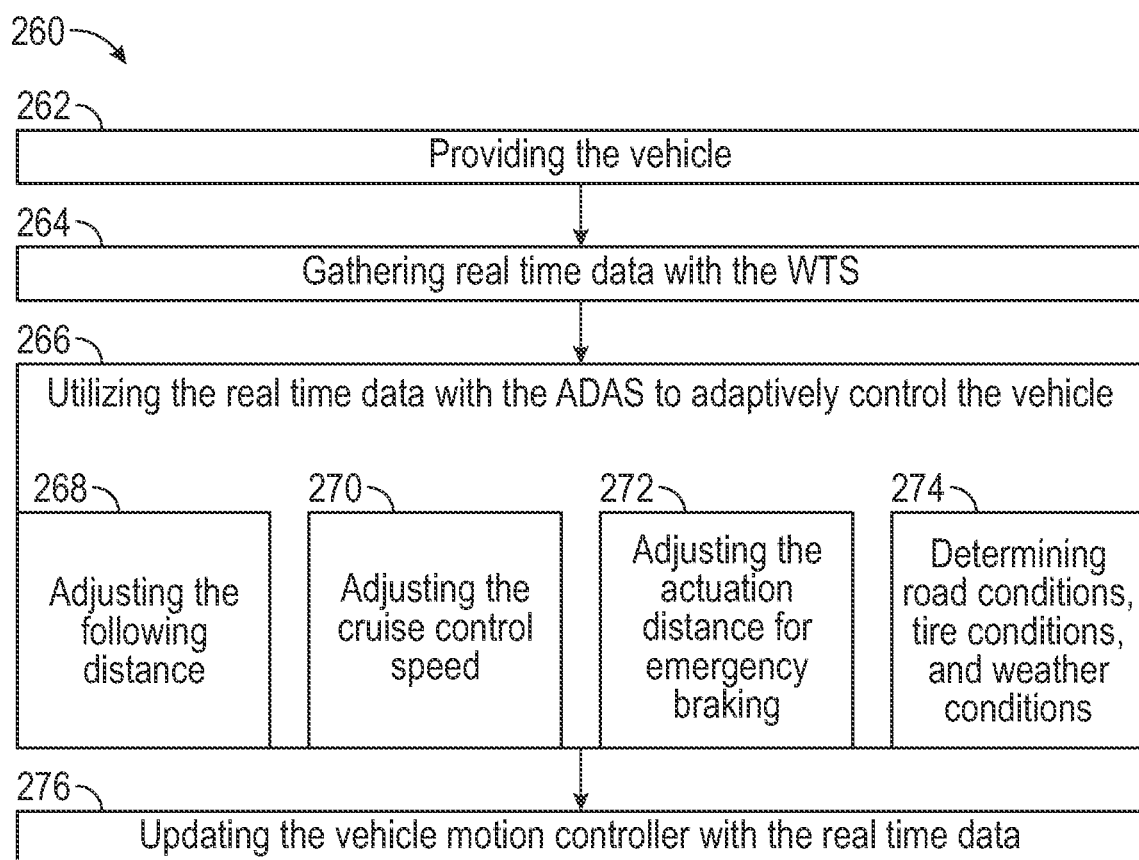
FIG. 9 is a flow chart corresponding to a method of adaptively controlling the vehicle of FIG. 6.

FIG. 9 shows an example of a method 260 of adaptively controlling the vehicle 202. The method 260 includes a first step 262 of providing the vehicle 202, a second step 264 of gathering real time data with the HWTS 220, and a third step 266 of utilizing the real time data with the ADAS 234 to adaptively control the vehicle 202. The step 266 includes a step 268 of adjusting the following distance (e.g., from D1 (FIG. 7) to D2 (FIG. 8)), a step 270 of adjusting the cruise control speed, a step 272 of adjusting the actuation distance for braking, and a step 274 of determining road conditions, tire conditions, and weather conditions. Finally, the method includes a step 276 of updating the vehicle motion controller 240 with the real time data.

Accordingly, it will be appreciated that the disclosed concept further provides for a new adaptive control system 203, vehicle 202 including the same, and associated method 260, in which a number of HWTSs 220 generate real time data while the vehicle 202 is being operated, thereby allowing the vehicle 202 to be adaptively controlled. Specifically, the real time data is gathered by the processor 230 of the vehicle 202, and utilized with the ADAS 234. As a result, the processor 230 causes the ADAS 234 to adjust any one or all of the following distances, cruise control speeds, and actuation distances for braking, that are involved during operation of the ADAS 234.

Figure 10:
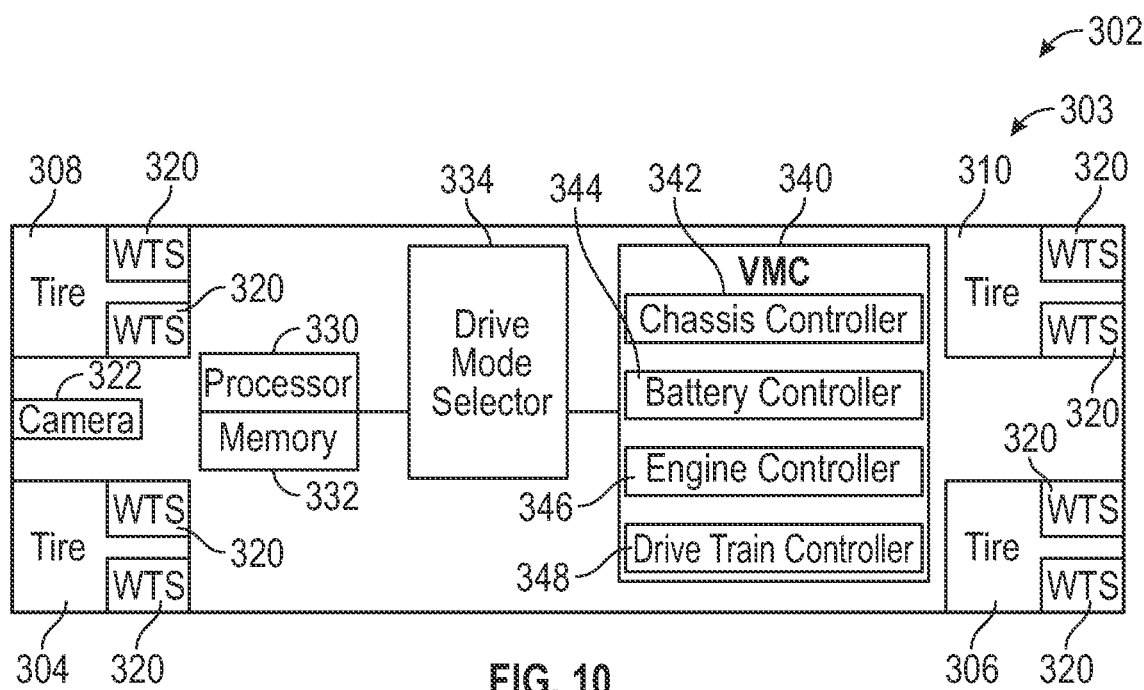
FIG. 10 is a simplified view of another vehicle, in accordance with another non-limiting embodiment of the disclosed concept.

FIG. 10 is a simplified view of a vehicle 302 and a drive mode adaptation system 303 therefor, in accordance with another non-limiting embodiment of the disclosed concept. The vehicle 302 is structured similar to the vehicles 2,202, discussed above, and includes a number of tires 304,306, 308,310, a number of HWTSs 320 coupled to an interior of each of the tires 304,306,308,310, a processor 330, and a memory 332. The drive mode adaptation system 303 includes the HWTS 320, the processor 330, and the memory 332.

It will be appreciated that each of the HWTSs 320 is configured exactly the same as the HWTSs 20,220, discussed above, and like the HWTSs 220, will be described herein in association with the vehicle 302 being in an ON state and being operated (e.g., driven). As such, because each of the HWTSs 320 is powered by a corresponding piezoelectric material (e.g., piezoelectric material 42 in FIG. 3), it will be appreciated that the HWTSs 320 are configured to transmit real time data to the processor 330. Additionally, because the HWTSs 320 include temperature, deformation, speed, pressure, and tread sensors 48,50,52,54,56 (see FIG. 3), it will be appreciated that data from each of these sensors is configured to be transmitted in real time to the processor 330 while the vehicle 302 is being operated. That is, tire temperature data, tire pressure data, tire deformation data, tire speed data, and tire wear data are all configured to be sent to the processor 330 in real time. Wheel slip data can also be sent to the processor 330 based on the real time data from each of the sensors 48,50,52,54,56.

By transmitting this real time data to the processor 330, the HWTS 320 is advantageously able to provide the vehicle 302 with capabilities not possible with today's TPMSs. Specifically, in one example embodiment the vehicle 302 further has a drive mode selector 334 electrically connected to the processor 330. The drive mode selector 334 is configured to provide the vehicle 302 with a number of different drive modes. See FIG. 11, for example, which shows the drive mode selector 334 having first, second, and third drive modes 335,336,337, and an OFF mode 338 corresponding to no drive mode being selected. It is understood that different road conditions demand different driving characteristics of the vehicle 302. This is a purpose of the drive mode selector 334, and the three different drive modes 335,336,337.

As used herein, the term "drive mode" shall mean an operating state of the vehicle 302. For example, the first drive mode 335 may have a first set of power maps, a first throttle response, a first suspension stiffness, a first steering feel, and a first traction control. These operating parameters all comprise the first "drive mode" 335. Similarly, the second and third "drive modes" 336,337 have second and third parameters for a set of power maps, throttle response, suspension stiffness, steering feel, and traction control that are at least partially different than that of the first "drive mode" 335. It will thus be appreciated that the three different drive modes 335,336,337 advantageously provide drivers of the vehicle 302 with the performance of three different vehicles in the single vehicle 302. Example drive modes include eco mode, sport mode, normal mode, and slippery mode.

When the vehicle 302 is being operated, the processor 330 is advantageously able to utilize the real time data from the HWTSs 320 with the drive mode selector 334 in order to determine a preferred drive mode (e.g., without limitation, a preferred one of the first, second, and third drive modes 335,336,337 and the OFF mode 338). The "preferred" drive mode is configured to be one of the drive modes 335,336, 337 or the OFF mode 338 that causes at least one of the set of power maps, throttle response, suspension stiffness, steering feel, and traction control of the vehicle 302 to have minimum internal resistance and/or be at greater operating efficiency than that experienced with other drive modes.

Figure 11:
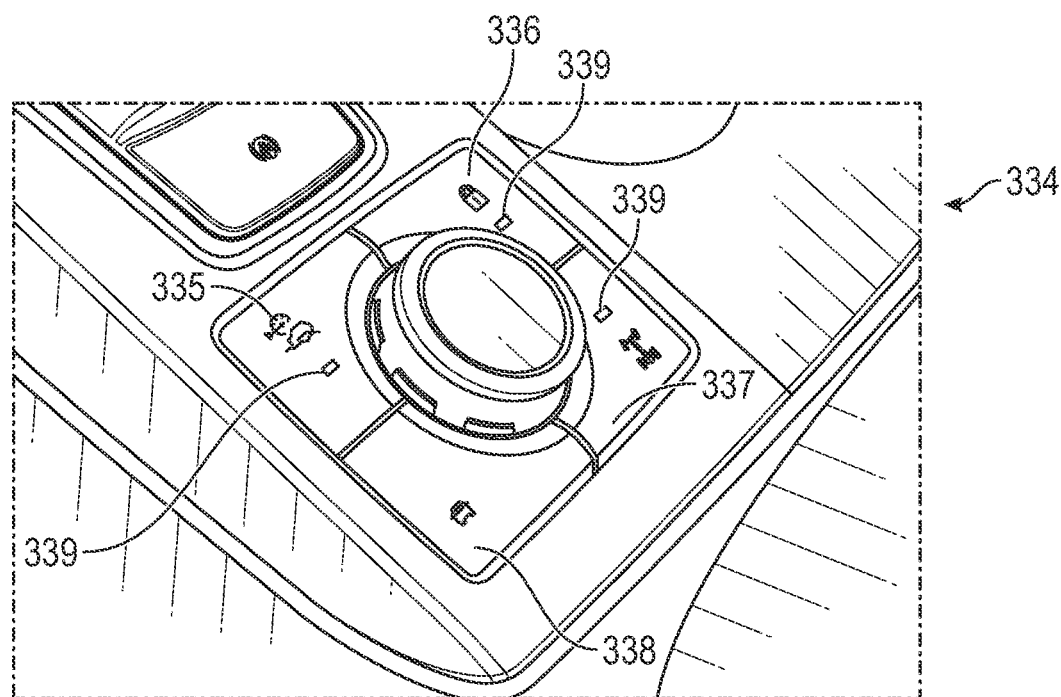
FIG. 11 shows a drive mode selector for the vehicle of FIG. 10.

Once the processor 330 determines the preferred drive mode, the processor 330 can cause an alert to be provided to a driver of the vehicle 302. For example, as shown in FIG. 11, the drive modes 335,336,337 each have a window 339 through which a blinking light could emanate. Having the processor 330 cause a blinking light to emanate through one of the windows 339 could alert a driver that any one of the drive modes 335,336,337 is preferred at a given time. Additionally, if the driver has selected a mode other than the preferred drive mode, it is contemplated that the drive mode adaptation system 303 can alert the driver of this fact, and/or can alert the driver if the conditions on the road change, e.g., via an audio alert from an audio system of the vehicle 302.

In order to determine the preferred drive mode, the drive mode adaptation system 303 utilizes the real time data of the HWTSs 320 in a similar manner that the adaptive control system 203, discussed above, utilizes the real time data of the HWTSs 220. More specifically, it is understood that since each of the HWTSs 320 is structured the same as the HWTS 20 (FIG. 3), each of the HWTSs 320 has temperature, deformation, pressure, speed, and tread sensors 48,50, 52,54,56. As such, real time data corresponding to these parameters, and wheel slip, is advantageously sent to the processor 330 while the vehicle 302 is being operated. In today's vehicles, drive mode selection is primarily based on user judgment and previously stored or real time location map data, and as such does not account for these parameters. However, proper drive mode selection is directly related to real time environmental and tire conditions.

For example and without limitation, if one of the tires 304,306,308,310 is underinflated (e.g., less inflated than an ideal tire), or if the vehicle 302 suddenly hits a hole in the road and one of the tires 304,306,308,310 undesirably deforms, or if the tread on one of the tires 304,306,308,310 is low, data corresponding to those parameters will be sent to the processor 330 in real time. That is, at any instant in time when the vehicle 302 is being operated, data of these parameters is being sent to the processor 330, which is electrically connected to the drive mode selector 334 and works with the drive mode selector 334 to determine the preferred drive mode. Accordingly, having the processor 330 factor in these parameters with the drive mode selector 334 in real time increases the likelihood that a preferred one of the drive modes 335,336,337 will be selected. Therefore, the possibility that a user will be operating the vehicle 302 in a drive mode unfit for the current environment (e.g., operating in a slippery drive mode on rough terrain), a situation which would compromise the integrity of certain systems of the vehicle 302, will be minimized.

It will be appreciated that the processor 330 is configured to employ algorithms with the real time data from the HWTSs 320, and other vehicle information to determine the preferred drive mode. Once the processor 330 has determined the preferred drive mode, the processor 330 is configured to cause the vehicle 302 to effectively manage dynamics of the preferred drive mode.

For example, and as shown in FIG. 10, the vehicle further has a vehicle motion controller 340 electrically connected to the processor 330, and the vehicle motion controller 340 has a chassis controller 342, a battery controller 344, an engine controller 346, and a drive train controller 348, all of which function together to operate the vehicle 302. It will be appreciated that the processor 330 further utilizes the real time data from the HWTSs 320 with the vehicle motion controller 340 to effectively manage dynamics (e.g., longitudinal and lateral dynamics) of the preferred drive mode.

As such, once the preferred drive mode has been determined by the processor 330, and an alert (e.g., without limitation, a blinking light in one of the windows 339 (FIG. 11)) has been provided to the driver, the vehicle 302 is structured to drive in that drive mode, should the driver select that drive mode. In one example embodiment, it is also contemplated that the processor 330 is configured to automatically select the preferred drive mode (e.g., one of the drive modes 335,336,337 or the OFF mode 338) after determining which drive mode is the preferred one, thereby eliminating the need for user action.

Furthermore, it will be appreciated that after gathering the real time data from the HWTSs 320, the processor 330 may predict terrain conditions with the real time data. That is, the processor 330 may determine if the vehicle 302 is operating on a slippery surface, a muddy surface, a rough road surface, etc. Data from the sensors 48,50,52,54,56 (FIG. 3) can be utilized to make this determination.

Additionally, as shown in FIG. 10, the vehicle 302 further has a camera 322 electrically connected to the processor 330. The camera 322 is configured to scan the terrain on which the vehicle 302 is being operated, and generate terrain data. In accordance with the disclosed concept, the processor 330 utilizes the terrain data from the camera 322 with the real time data from the HWTSs 320 in order to boost a confidence score of the terrain conditions. As such, not only does the real time data from the HWTSs 320 factor into the determination of the preferred drive mode, but in one example embodiment the terrain data from the camera 322 also factors in, thereby providing for a relatively accurate prediction of what the preferred drive mode is. Moreover, once the drive mode adaptation system 303 has confidence in the terrain surface, e.g., after processing the real time data from HWTSs 320, the system 303 will vote for the preferred drive mode appropriate for the road surface, and in response either alert the driver of the preferred drive mode or automatically select the preferred drive mode for the driver.

Figure 12:
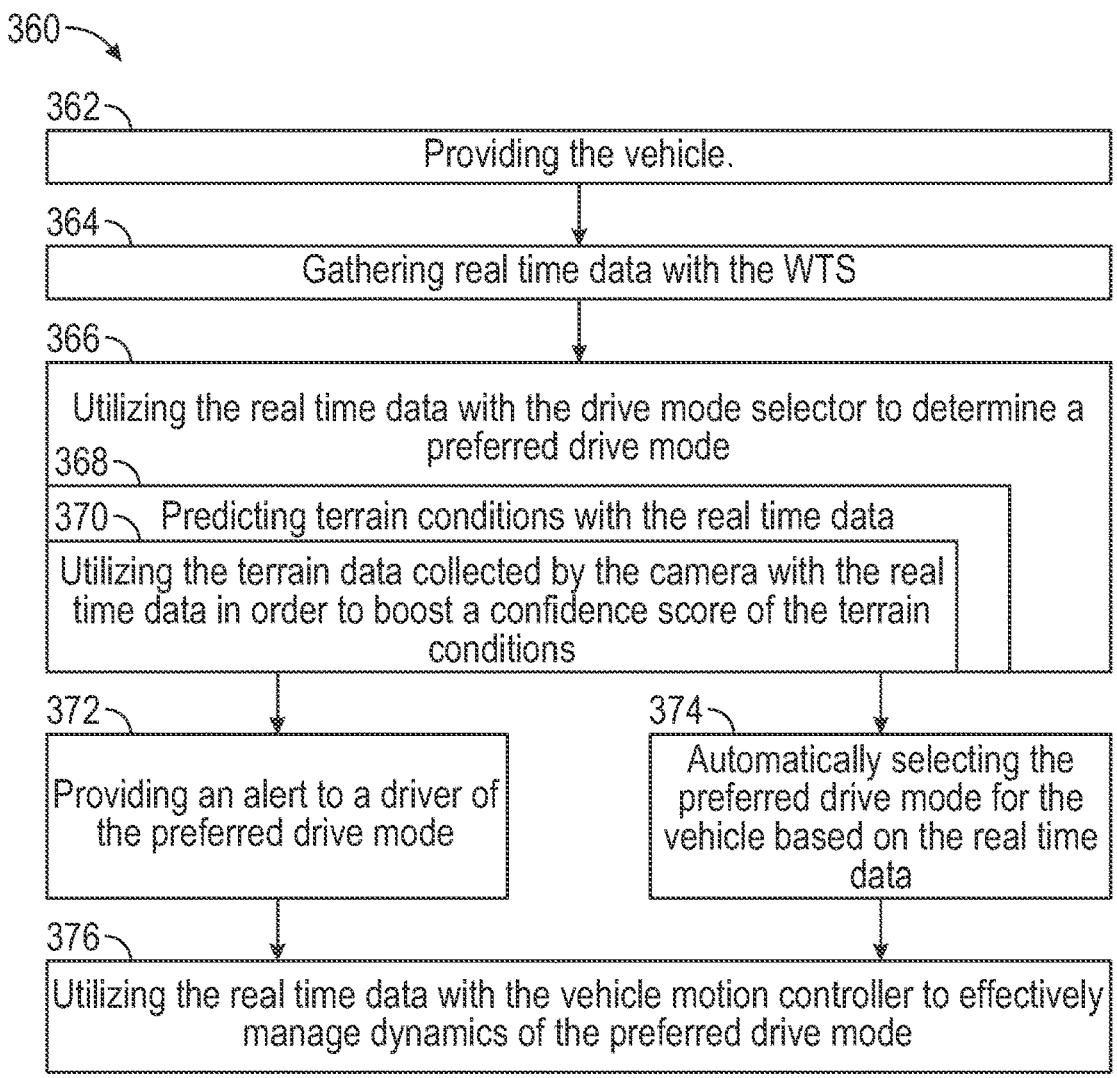
FIG. 12 is a flow chart corresponding to a method for drive mode adaptation.

FIG. 12 shows an example method 360 for drive mode adaptation, in accordance with one non-limiting aspect of the disclosed concept. The method 360 includes a first step 362 of providing the vehicle 302, a second step 364 of gathering real time data with the HWTS 320, and a third step 366 of utilizing the real time data with the drive mode selector 334 to determine a preferred drive mode. The step 366 includes a step 368 of predicting terrain conditions with the real time data, which includes a step 370 of utilizing the terrain data collected by the camera 322 with the real time data in order to boost a confidence score of the terrain conditions. It will be appreciated that once the preferred drive mode is determined by the processor 330, the method further includes either a step 372 of providing an alert to a driver of the preferred drive mode, or a step 374 of automatically selecting the preferred drive mode for the vehicle 302 based on the real time data. Regardless of whether step 372 or step 374 is performed, the method 360 further includes a step 376 of utilizing the real time data with the vehicle motion controller 340 to effectively manage dynamics of the preferred drive mode.

Accordingly, it will be appreciated that the disclosed concept provides for a new drive mode adaptation system 303, vehicle 302 including the same, and associated method 360, in which a number of HWTSs 320 provide real time data (e.g., tire temperature data, tire pressure data, tire deformation data, tire speed data, tire wear data, and wheel slip data) to a processor 330, which is utilized with a drive mode selector 334 in order to determine a preferred drive mode for the vehicle 302. By driving in the preferred drive mode, as opposed to a different one determined through user judgment, the vehicle 302 is more efficiently operated in that preferred internal mechanisms can be utilized for given road and tire conditions.

Figure 13:
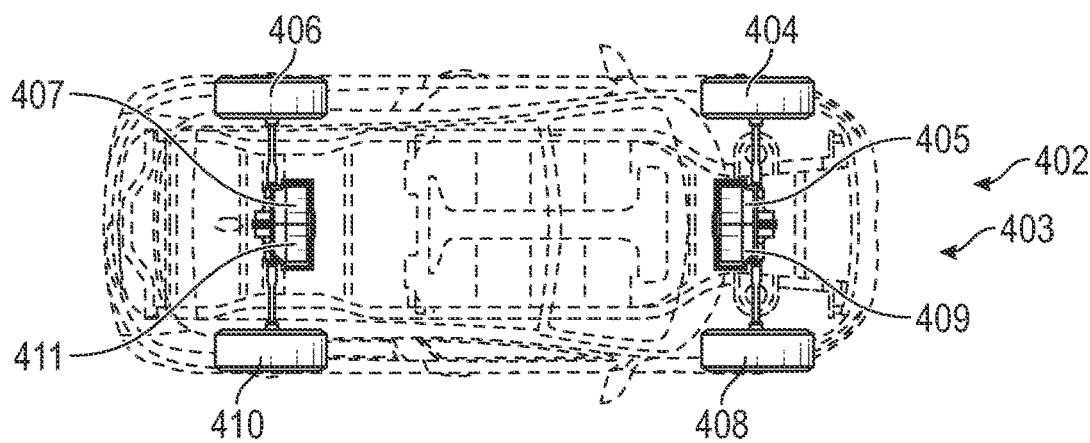
FIG. 13 is a schematic of another vehicle, in accordance with another non-limiting embodiment of the disclosed concept.
Figure 14:
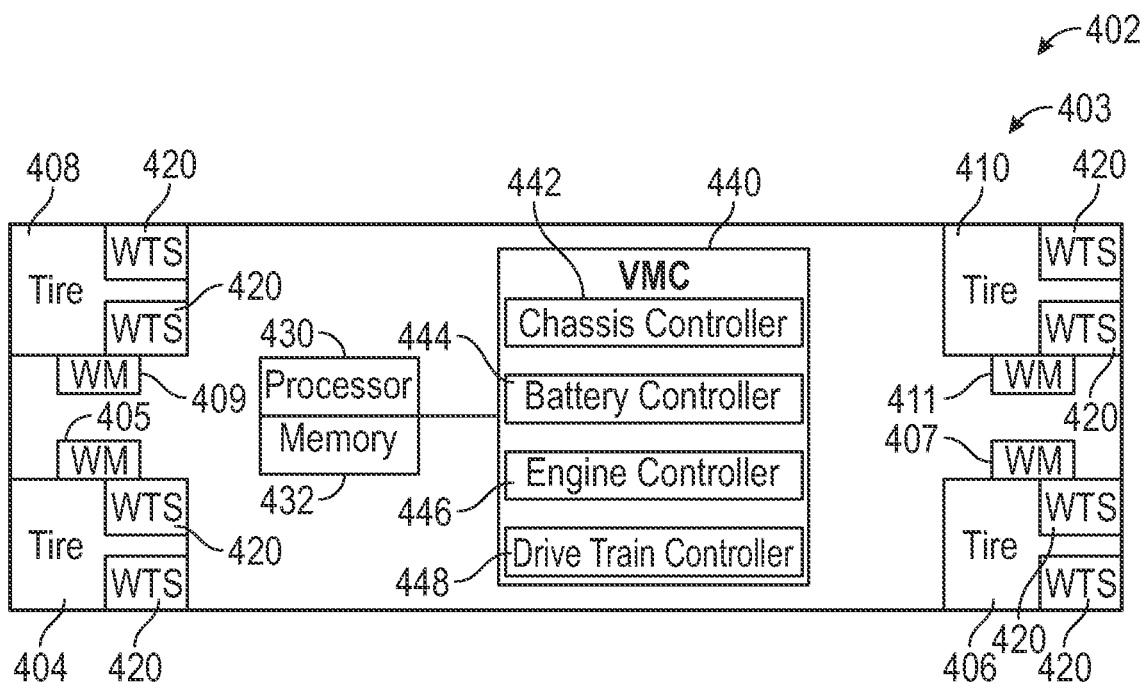
FIG. 14 is a simplified view of the vehicle of FIG. 13.

FIG. 13 is a schematic view and FIG. 14 is a simplified view of a vehicle 402 and a wheel motor compensation system 403 therefor, in accordance with another non-limiting embodiment of the disclosed concept. The vehicle 402 is structured similar to the vehicles 2,202,302, discussed above, and includes a number of tires 404,406,408,410, a number of HWTSs 420 coupled to an interior of each of the tires 404,406,408,410, a processor 430, and a memory 432. The wheel motor compensation system 403 includes the HWTS 420, the processor 430, and the memory 432.

It will be appreciated that each of the HWTSs 420 is configured exactly the same as the HWTSs 20,220,320 discussed above, and like the HWTSs 220,320, will be described herein in association with the vehicle 402 being in an ON state and being operated (e.g., driving). In one example embodiment, in addition to the tire temperature data, tire pressure data, tire deformation data, tire speed data, tire wear data, and wheel slip data, it will also be appreciated that the real time data of the HWTSs 420 further includes vibration-sound data based on an interaction between the tires 404,406,408,410 and a road surface.

By transmitting this real time data to the processor 430, the HWTS 420 is advantageously able to provide the vehicle 402 with capabilities not possible with today's TPMSs. For example, as shown in FIG. 14, the vehicle 402 further has a number of wheel motors 405,407,409,411 each coupled to and configured to apply torque to a corresponding one of the tires 404,406,408,410. As such, it will be appreciated that the vehicle 402 offers the ability to have multiple electric wheel motors 405,407,409,411. It is contemplated that the wheel motors 405,407,409 are configured to control each of the tires 404,406,408,410 independently of one another. As a result, the wheel motors 405,407,409,411 advantageously allow the vehicle 402 to do unique maneuvers like performing tank turns and/or using torque vectoring to allow for sharper turns. Additionally, in one example embodiment, the wheel motors 405,407,409,411 are one of an in-wheel hub motor and a body mounted direct drive motor. It will be understood that the wheel motors 405,407,409,411 are configured to individually apply torque to the tires 404,406,408, 410 to cause them to rotate.

In accordance with the disclosed concept, the HWTSs 420 are configured to allow for more efficient control of the vehicle 402, e.g., as compared to vehicles having TPMSs (not shown). More specifically, after the processor 430 has gathered the real time data (e.g., tire temperature, pressure, deformation, wear, wheel slip, rotational speed data, and vibration-sound data) with the HWTSs 420, the processor 430 is configured to utilize the real time data to compensate the wheel motors 405,407,409,411 so that preferred torque is applied to the tires 404,406,408,410.

Furthermore, the wheel motor compensation system 403 of the disclosed concept advantageously allows for a higher data transmission. Thus, a higher data rate can be provided to the processor 430 and the wheel motors 405,407,409,411, which enhances the algorithm of the processor 430 and performance of coordination between the tires 404,406,408, 410. It will further be appreciated that utilizing the real time data with the processor 430 includes predicting terrain conditions (e.g., icy, snowy, muddy, etc.) with the real time data, and utilizing the predictions of terrain conditions to compensate the wheel motor 405,407,409,411 so that preferred torque is applied to the tires 404,406,408,410.

Figure 15:
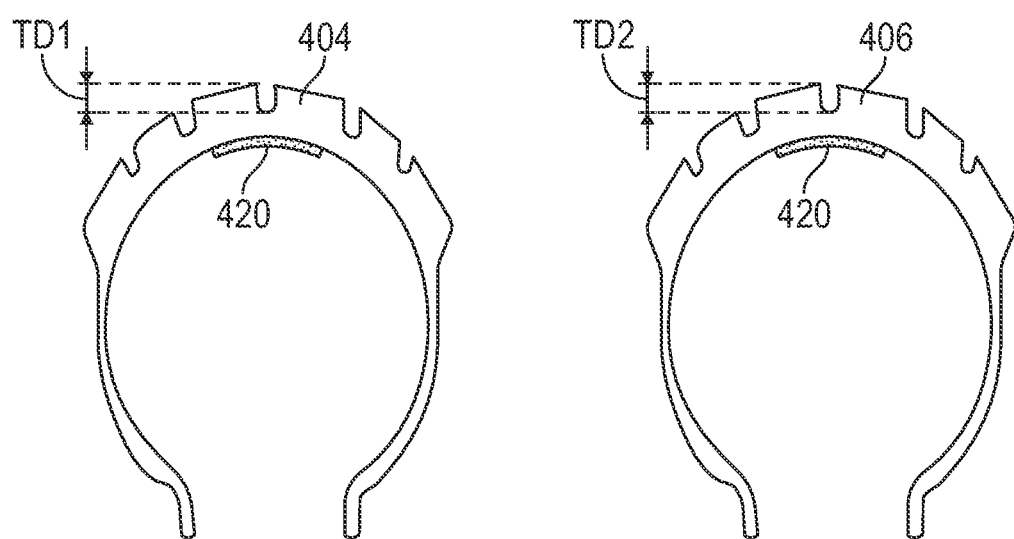
FIG. 15 is a schematic of a portion of the vehicle of FIG. 13.

In turn, by having preferred torque applied to the tires 404,406,408,410, the vehicle 402 can be more efficiently controlled and more efficiently operated (e.g., from an energy savings and maneuverability standpoint). For example and without limitation, as shown in FIG. 15, the first tire 404 has a first tread depth TD1 and the second tire 406 has a second tread depth TD2. This tread depth data is advantageously sent by the HWTSs 420 in real time to the processor 430 (FIG. 14).

Accordingly, the processor 430 may further determine if the first tread depth TD1 is lower than the second tread depth TD2. Once the processor 430 determines that the first tread depth TD1 is lower than the second tread depth TD2, the processor 430 may increase torque applied by the wheel motor 405 to the first tire 404. Accordingly, the HWTSs 420 advantageously provide a mechanism for environmental and tire conditions to be factored into the determination of how much torque is applied by the wheel motors 405,407,409, 411 to the tires 404,406,408,410. In today's vehicles, which rely on TPMSs, data corresponding to these parameters is not factored into the calculus.

Additionally, while the disclosed example has been described in association with tread depth, it will be appreciated that other parameters, including tire temperature, pressure, deformation, wheel slip, and rotational speed, may individually affect how much one of the wheel motors 405,407,409,411 is compensated. That is, if the processor 430 determines that there is an undesirable differential between the temperature, pressure, deformation, wheel slip, rotational speed, and vibration-sound of one tire versus another tire, or any combination of differentials of these parameters, the processor 430 may compensate a corresponding one of the wheel motors 405,407,409,411 to apply a preferred torque.

In another non-limiting example embodiment, the wheel motor compensation system 403 of the disclosed concept may assist tires when they get stuck, e.g., on a muddy surface. It is known that tires at times get stuck, or become prevented from rotating, while a vehicle is being driven. This can be understood as a given tire being in a NON-FUNCTIONING state. In accordance with the disclosed concept, the wheel motor compensation system 403 provides a solution to this problem. More specifically, responsive to the second tire 406 (FIG. 15) moving from a FUNCTIONING state to a NON-FUNCTIONING state (e.g., when the second tire 406 drives over a muddy surface and temporarily ceases rotating or rotates at a less than desirable speed), the processor 430 is further caused to increase torque applied by the wheel motor 405 so that the first tire 404 can cause the second tire 406 to move from the NON-FUNCTIONING state to the FUNCTIONING state.

This advantage is achievable with the HWTSs 420. In particular, the HWTSs 420 coupled to the interior of the second tire 406, in the example embodiment, will transmit real time data corresponding to, among other types of data, wheel slip, thereby communicating to the processor 430 that the second tire 406 is in a NON-FUNCTIONING state. In turn, the processor 430 can cause the wheel motors 405, 409,411 coupled to the other tires 404,408,410, either together or in isolation, to be compensated and thus apply preferred torque, which may be greater torque, to those tires 404,408,410, thereby allowing the second tire 406 to move to a FUNCTIONING state.

As a result, the vehicle 402 is configured to operate more efficiently than vehicles in today's art, which have wheel motors that apply torque to wheels without factoring in real time data related to environmental and tire conditions. As such, each of the tires 404,406,408,410 is configured to have torque applied to it that is based at least in part on real time tire temperature data, pressure data, deformation data, wear data, wheel slip data, rotational speed data, and vibration-sound data of all of the tires 404,406,408,410.

Furthermore, because this data is being gathered by the processor 430 in real time, wheel motor compensations are likewise made in real time in order to change the applied torque to the tires 404,406,408,410 from a first torque to a second, preferred torque. Thus, the preferred torque is advantageously able to be determined and applied to the tires 404,406,408,410 in real time based at least in part on the data from the HWTSs 420. Stated differently, the preferred torque applied by any one of the wheel motors 405,407,409,411 is dependent on environmental and tire data from the HWTSs 420 that are coupled to each of the tires 404,406,408,410.

As stated above, the dynamic equation for angular motion of a wheel is:

$$\dot{w}_w = [T_e - T_b - R_w F_t - R_w F_v]/J_w$$

Using the HWTSs 420, more accurate and real time data is collected for pressure, temperature, wear, deformation, rotational speed, and wheel slip. In today's vehicles, $F_w$ and $F_t$ all include estimated (e.g., not real time determinations) values of tire temperature, pressure, and wear. In accordance with the disclosed concept, the values of $F_w$ and $F_t$ are multiplied by a correction factor $C_t$ and $C_w$, where $C_t$ is the tractive force correction factor and $C_w$ is the wheel friction correction factor. Therefore, the dynamic equation for angular motion of a wheel becomes:

$$\dot{w}_w = [T_e - T_b - (C_t) R_w F_t - (C_w) R_w F_w]/J_w$$

It will thus be appreciated that a more accurate determination of angular motion is advantageously able to be determined with the data from the HWTSs 420, and a corresponding preferred level of torque can independently be applied to each of the tires 404,406,408,410 from each of the wheel motors 405,407,409,411.

Referring again to FIG. 14, the vehicle 402 further has a vehicle motion controller 440 electrically connected to the processor 430. The vehicle motion controller 440 has a chassis controller 442, a battery controller 444, an engine controller 446, and a drive train controller 448 that each function together in order for the vehicle 402 to be operated. It will be appreciated that the processor 430 is configured to utilize the real time data with the wheel motors 405,407, 409,411 and the vehicle motion controller 440 in order for the vehicle 402 to be more effectively operated.

Figure 16:
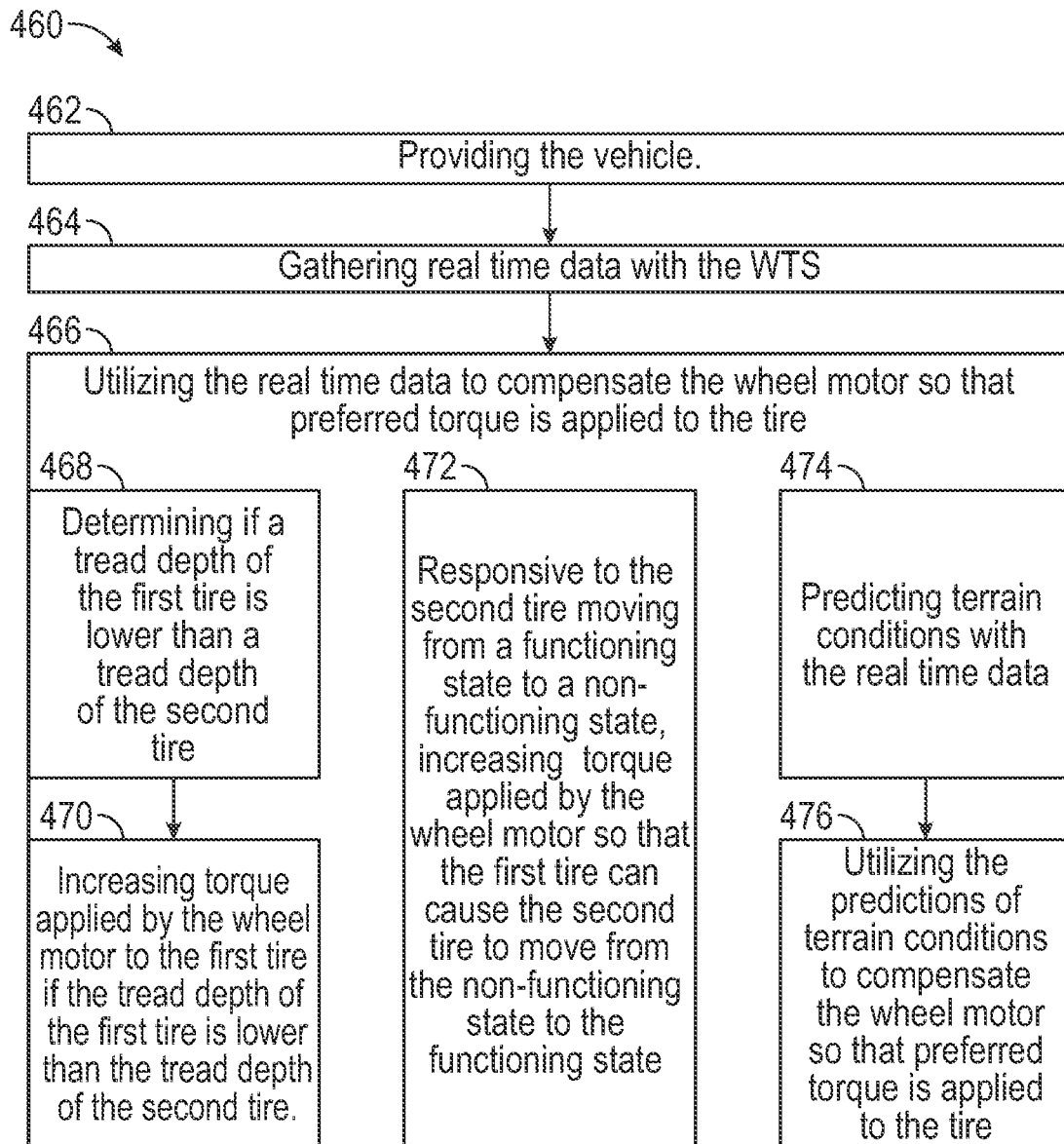
FIG. 16 is a flow chart corresponding to a method for wheel motor compensation.

FIG. 16 shows an example method 460 for wheel motor compensation, in accordance with one non-limiting embodiment of the disclosed concept. The method includes a first step 462 of providing the vehicle 402, a second step 464 of gathering real time data with the HWTS 420, and a third step 466 of utilizing the real time data to compensate the wheel motor 405,407,409,411 so that preferred torque is applied to the tire 404,406,408,410. The step 466 includes a step 468 of determining if a tread depth TD1 of the first tire 404 is lower than a tread depth TD2 of the second tire 406, and a step 470 of increasing torque applied by the wheel motor 405 to the first tire 404 if the tread depth TD1 of the first tire 404 is lower than the tread depth TD2 of the second tire 406. Additionally, the step 466 also includes a step 472 of, responsive to the second tire 406 moving from a FUNCTIONING state to a NON-FUNCTIONING state, increasing torque applied by the first wheel motor 405 so that the first tire 404 can cause the second tire 406 to move from the NON-FUNCTIONING state to the FUNCTIONING state. Finally, the step 466 also includes a step 474 of predicting terrain conditions with the real time data and a step 476 of utilizing the predictions of terrain conditions to compensate the wheel motor 405,407,409,411 so that preferred torque is applied to the tire 404,406,408,410.

Accordingly, it will be appreciated that the disclosed concept provides for a new (e.g., without limitation, more efficient to operate in terms of energy savings and maneuverability) wheel motor compensation system 403, vehicle 402 including the same, and associated method 460, in which a number of HWTSs 420 provide real time data corresponding to tire temperature, pressure, deformation, wear, wheel slip, rotational speed, and vibration-sound, to a processor 430, which in turn utilizes the data to compensate any one or all of a number of wheel motors 405,407,409,411 so that preferred torque is applied to a number of tires 404,406,408,410 of the vehicle 402. As a result, with wheel motor compensations being made in real time, and based on the real time data of the HWTSs 420 from each of the tires 404,406,408,410, preferred torque is advantageously able to be applied by the wheel motors 405,407,409,411 at greater rates, thereby allowing the vehicle 402 to be more efficiently operated and controlled while on the road.

While the disclosed concept has been described in association with the vehicles 2,202,302,402 including corresponding theft detection systems 3, adaptive control systems 203, drive mode adaptation systems 303, and wheel motor compensation systems 403, it will be appreciated that a suitable alternative vehicle could individually include any number of the disclosed systems 3,203,303,403, without departing from the scope of the disclosed concept.

Although generally illustrated as a sport utility, the vehicles 2,202,302,402 may take the form of another passenger or commercial automobile such as, for example, a performance vehicle, a car, a truck, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc.

The vehicles 2,202,302,402 may be configured as an electric vehicle (EV). More particularly, the vehicles 2,202, 302,402 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicles 2,202,302,402 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicles 2,202,302,402 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

Additionally, the processors 30,230,330,430 may be commercially available general-purpose processors, such as a processor from the Intel® or ARM® architecture families. The memories 32,232,332,432 may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is That which is claimed is:

1. A wheel motor compensation system for a vehicle having a wheel motor and a tire coupled to the wheel motor, comprising:
   a hybrid wireless tire sensor (HWTS) coupled to an interior of the tire;
   a processor electrically connected to the wheel motor; and
   a memory comprising instructions that, when executed by the processor, cause the processor to perform operations comprising:
      gathering real time data with the HWTS, and
      utilizing the real time data to compensate the wheel motor so that preferred torque is applied to the tire.

2. The system according to claim 1, wherein the tire is a first tire, wherein the vehicle further comprises a second tire, and wherein utilizing the real time data comprises:
   determining if a tread depth of the first tire is lower than a tread depth of the second tire, and
   increasing torque applied by the wheel motor to the first tire if the tread depth of the first tire is lower than the tread depth of the second tire.

3. The system according to claim 2, wherein utilizing the real time data further comprises:
   responsive to the second tire moving from a FUNCTIONING state to a NON-FUNCTIONING state, increasing torque applied by the wheel motor so that the first tire can cause the second tire to move from the NON-FUNCTIONING state to the FUNCTIONING state.

4. The system according to claim 1, wherein the real time data comprises temperature data, pressure data, deformation data, rotational speed data, wear data, and wheel slip data.

5. The system according to claim 4, wherein the real time data further comprises vibration-sound data based on an interaction between the tire and a road surface.

6. The system according to claim 1, wherein the wheel motor is selected from the group consisting of an in-wheel hub motor and a body mounted direct drive motor.

7. The system according to claim 1, wherein utilizing the real time data comprises:
   predicting terrain conditions with the real time data, and
   utilizing the predictions of terrain conditions to compensate the wheel motor so that preferred torque is applied to the tire.

8. The system according to claim 1, wherein the HWTS comprises a piezoelectric material configured to generate a voltage and power the HWTS.

9. A vehicle, comprising:
   a wheel motor;
   a tire coupled to the wheel motor;
   a hybrid wireless tire sensor (HWTS) coupled to an interior of the tire;
   a processor electrically connected to the wheel motor; and
   a memory comprising instructions that, when executed by the processor, cause the processor to perform operations comprising:
      gathering real time data with the HWTS, and
      utilizing the real time data to compensate the wheel motor so that preferred torque is applied to the tire.

10. The vehicle according to claim 9, wherein the tire is a first tire, wherein the vehicle further comprises a second tire, and wherein utilizing the real time data comprises:
    determining if a tread depth of the first tire is lower than a tread depth of the second tire, and
    increasing torque applied by the wheel motor to the first tire if the tread depth of the first tire is lower than the tread depth of the second tire.

11. The vehicle according to claim 10, wherein utilizing the real time data further comprises:
    responsive to the second tire moving from a FUNCTIONING state to a NON-FUNCTIONING state, increasing torque applied by the wheel motor so that the first tire can cause the second tire to move from the NON-FUNCTIONING state to the FUNCTIONING state.

12. The vehicle according to claim 9, wherein the real time data comprises temperature data, pressure data, deformation data, rotational speed data, wear data, and wheel slip data.

13. The vehicle according to claim 12, wherein the real time data further comprises vibration-sound data based on an interaction between the tire and a road surface.

14. The vehicle according to claim 9, wherein the wheel motor is selected from the group consisting of an in-wheel hub motor and a body mounted direct drive motor.

15. The vehicle according to claim 9, wherein utilizing the real time data comprises:
    predicting terrain conditions with the real time data, and
    utilizing the predictions of terrain conditions to compensate the wheel motor so that preferred torque is applied to the tire.

16. The vehicle according to claim 9, further comprising a number of other HWTS's coupled to the interior of the tire, and wherein the instructions are further configured to cause the processor to perform operations of:
    gathering real time data with the number of other HWTS's, and
    utilizing the real time data of the number of other HWTS's to compensate the wheel motor so that preferred torque is applied to the tire.

17. A method for wheel motor compensation, comprising:
    providing a vehicle comprising a wheel motor, a tire coupled to the wheel motor, a hybrid wireless tire sensor (HWTS) coupled to an interior of the tire, and a processor electrically connected to the wheel motor;
    gathering real time data with the HWTS; and
    utilizing the real time data to compensate the wheel motor so that preferred torque is applied to the tire.

18. The method according to claim 17, wherein the tire is a first tire, wherein the vehicle further comprises a second tire, and wherein utilizing the real time data comprises:
    determining if a tread depth of the first tire is lower than a tread depth of the second tire; and
    increasing torque applied by the wheel motor to the first tire if the tread depth of the first tire is lower than the tread depth of the second tire.

19. The method according to claim 18, wherein utilizing the real time data further comprises:
    responsive to the second tire moving from a FUNCTIONING state to a NON-FUNCTIONING state, increasing torque applied by the wheel motor so that the first tire can cause the second tire to move from the NON-FUNCTIONING state to the FUNCTIONING state.

20. The method according to claim 19, wherein utilizing the real time data further comprises:
    predicting terrain conditions with the real time data; and
    utilizing the predictions of terrain conditions to compensate the wheel motor so that preferred torque is applied to the tire.

* * * * *